United States Patent [19]

Fenoglio

[11] 4,058,683
[45] Nov. 15, 1977

[54] EXPANDABLE MEMORY FOR ASYNCHRONOUS PCM MULTIPLEXER

[75] Inventor: Francesco Fenoglio, Milan, Italy

[73] Assignee: Societa Italiana Telecomunicazioni SIEMENS S.p.A., Milan, Italy

[21] Appl. No.: 684,012

[22] Filed: May 7, 1976

[30] Foreign Application Priority Data

May 9, 1975   Italy .................................. 23141/75

[51] Int. Cl.² .............................................. H04J 3/06
[52] U.S. Cl. ........................... 179/15 AF; 179/15 BA
[58] Field of Search ........ 179/15 AF, 15 BV, 15 BA; 178/50, 69.5 R

[56] References Cited

U.S. PATENT DOCUMENTS

| | | | |
|---|---|---|---|
| 3,873,773 | 3/1975 | Guy | 179/15 AF |
| 3,931,473 | 1/1976 | Ferris | 179/15 AF |

Primary Examiner—William C. Cooper
Assistant Examiner—Joseph A. Popek
Attorney, Agent, or Firm—Karl F. Ross

[57] ABSTRACT

Four bit streams arriving simultaneously over respective incoming lines at a transmitting terminal, connected via a PCM link with a remote receiving terminal, constitute recurrent lower-order frames whose bits are to be interleaved in a composite higher-order frame to be sent on to the remote terminal for redistribution over four outgoing lines. The bits of each incoming bit stream are cyclically written in an 8-stage buffer register at their rate of arrival, the contents of the register stages being read out at a higher rate to allow for the interpolation of ancillary bits constituting supervisory signals. Each higher-order frame consists of four subframes in which the message bits from the contributing bit streams are preceded by one or more ancillary bits; the latter include a discriminating bit in each of the last three subframes indicating whether or not a further bit in the fourth subframe is a stuffing bit or a message bit. The insertion of a stuffing bit, i.e. the delay by one time slot of the readout of a message bit from a stage of the buffer register, is controlled by a comparator receiving writing and reading pulses respectively timing the loading of the eighth register stage and the unloading of the fourth register stage; upon a coincidence of these pulses in a first subframe, a presetting section of the comparator enables an execution section thereof to emit a stuffing command in the following three subframes causing the generation of the discriminating bit at the beginning of each of these subframes and the blanking of the time slot immediately following the last discriminating bit.

10 Claims, 7 Drawing Figures

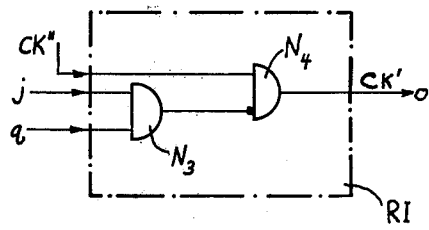
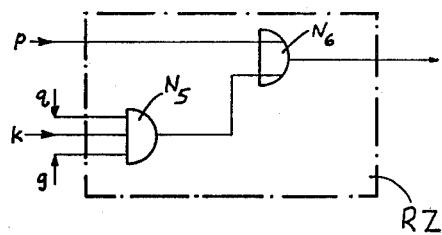
FIG. 4  FIG. 5
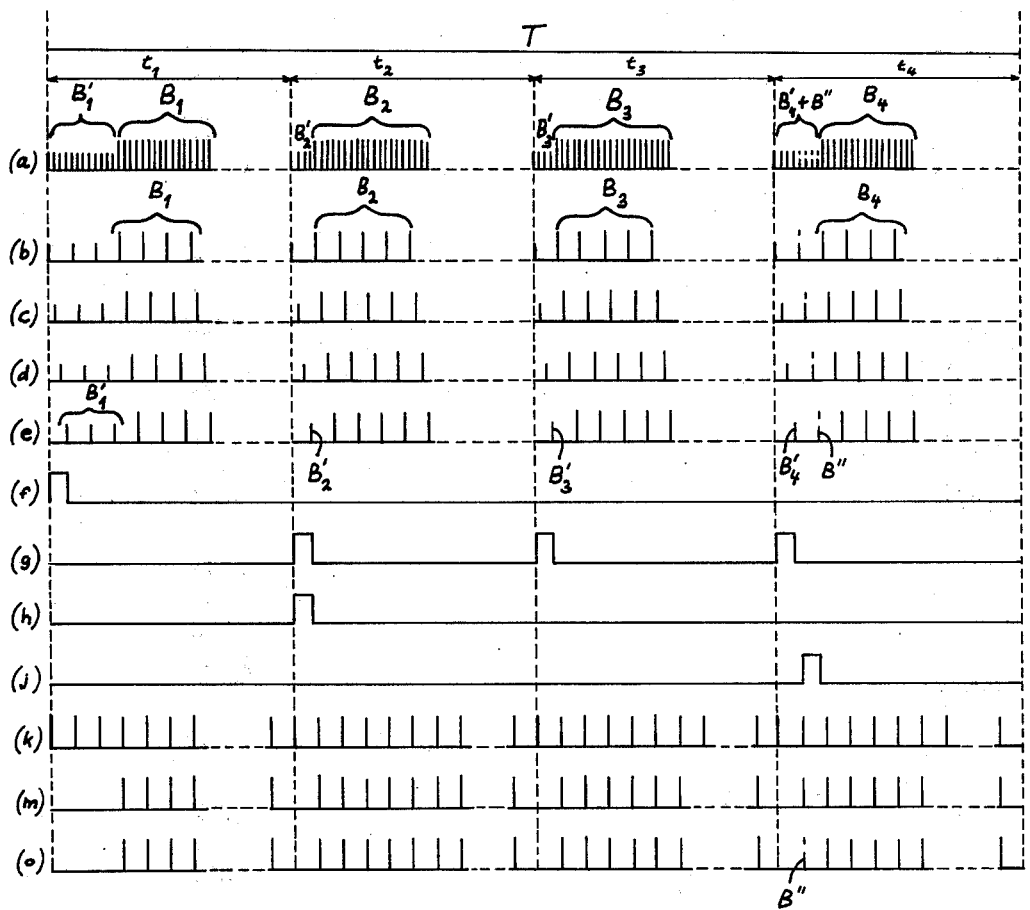
FIG. 6

EXPANDABLE MEMORY FOR ASYNCHRONOUS PCM MULTIPLEXER

FIELD OF THE INVENTION

My present invention relates to a telecommunication system of the pulse-code-modulation (PCM) type and, more particularly, to an expandable memory employed in such a system.

BACKGROUND OF THE INVENTION

In transmitting voice-frequency samples and other message signals by the PCM technique from a variety of sources to a corresponding number of destinations, it is customary to interleave the bits of binary words from different sources, representing the quantized instantaneous signal amplitudes, in a recurrent frame for transmission at a higher bit frequency or cadence over a common signal path. Several such signal paths may, in turn, be merged with interleaving of the bits of their frames in a secondary frame; again, the bits of a plurality of such secondary frames may be interleaved in a tertiary frame, and so on.

Thus, a transmitting terminal at the input end of a PCM link, designed to carry a bit stream with a recurrent higher-order frame to a receiving terminal at its output end, may serve a plurality of incoming lines carrying contributory bit streams each in the form of a recurrent lower-order frame. All these incoming bit streams will generally have the same cadence, e.g. of 8.448 Mbits/sec in the case of incoming secondary frames, so that the transmission rate of the interleaved message bits from four incoming lines traveling over the common PCM link in a higher-order (e.g. tertiary) outgoing frame ought to be 33.792 Mbits/sec. In practice, however, the higher-order frame must include additional time slots designed to accommodate ancillary bits for supervisory signals which accompany the message signals from the lower-order frames to insure synchronization, provide distribution information (i.e. to identify the contributing bit streams in the composite frame) and convey alarm indication in the event of a malfunction. It is therefore necessary to adopt a higher bit cadence, e.g. of 34.368 Mbits/sec, for the composite bit stream passing from a multiplexer at the transmitting terminal to a demultiplexer at the receiving terminal.

If the departing bits are delivered by the multiplexer at a frequency $F_m$ and if each composite frame synthesized from the bits of four frames contains $X$ message bits and $x$ ancillary bits for each contributing frame, then the mean recurrence rate $F_d$ of the message bits of each contributing frame in the composite frame will be given by $$F_d = F_m \cdot (X - x/4X)$$

That mean frequency $F_d$, however, generally does not correspond to a whole number of bits or time slots per frame period wherefore it is customary to resort to a technique known as "bit stuffing", i.e. the use of a blank time slot devoid of message information during certain frames. This produces two different values for the mean frequency $F_d$ which, when averaged over a multiplicity of frame periods, correspond to the bit cadence $f_m$ in each contributing frame.

OBJECTS OF THE INVENTION

The general object of my present invention is to provide a so-called expandable memory of simple construction which allows for the difference between the cadence $f_m$ of the message bits in each contributing stream and the actual (as distinct from average) recurrence rate $F_m/4$ of these bits in the composite frame.

A more particular object is to provide simple means in such an expandable memory for generating a stuffing bit at the proper instant and indicating the presence or absence of such a stuffing bit to a complementary memory at the receiving terminal.

SUMMARY OF THE INVENTION

In accordance with my present invention, such an expandable memory comprises a register with $n$ stages (e.g. $n=8$) for the temporary storage of $n$ consecutive message bits of an incoming bit stream, the recurrent sequential loading and unloading of these stages being timed by writing-control means and reading-control means, respectively; the loading of consecutive register stages proceeds at a rate corresponding to the cadence of the contributing bit streams whereas the unloading is carried out at a higher rate corresponding to the $z^{th}$ part of the cadence of the composite bit stream where $z$ is the number of incoming lines at the transmitting terminal and also the number of outgoing lines respectively paired (at least temporarily) with these incoming lines at the remote receiving terminal. The period of a frame of the composite bit stream, substantially equaling the frame period of each contributing bit stream, is divided into several subframes extending over consecutive intervals of predetermined length, each subframe starting with an initial gap of one or more time slots during which no message bits are read out from the register and which are reserved for ancillary bits including those of synchronizing, distribution and alarm signals as discussed above. In a preferred embodiment more fully described hereinafter, these conventional ancillary bits are introduced in the initial gap of the first subframe; they are of no further interest in conjunction with the present invention.

A comparison network, connected to the writing-control and reading-control means, determines the delay intervening between the loading and the unloading of a given register stage and generates a preparatory signal whenever that delay falls short of a predetermined period equaling less than $n$ bit cycles, this period being preferably equal to $n/2$ cycles. The comparator includes circuitry controlled by a timer, which generates distinctive control pulses in different subframes, for emitting a stuffing command in response to the generation of the aforementioned preparatory signal, provided that signal occurs in an early subframe (preferably the first) preceding at least one other subframe. A blocking network, responding to the stuffing command from the comparator and to a control pulse from the timer, inhibits the unloading of a register stage in a predetermined time slot, normally allocated to a message bit, of a later subframe, preferably the fourth and last subframe. Finally, an insertion network responds to a stuffing command and to a control pulse from the timer to generate a discriminating bit in the initial gap of at least one subframe following the one in which the preparatory signal giving rise to the stuffing command has been generated. In the preferred embodiment of my invention, such a discriminating bit comes into existence in the initial gaps of the second, third and fourth subframes, the last discriminating bit immediately preceding the time slot used for bit stuffing; the availability of three discriminating bits per contributing frame reduces the risk of malfunction due to transmission error.

According to another advantageous feature of my invention, the delay between the loading and the unloading of a given register stage is ascertained by connecting respective inputs of the comparator to a writing-control input of one specific stage of the register and to an output of a pulse counter, forming part of the reading-control means, which is energized during the reading of another specific register stage. With these two specific register stages arranged $n/2$ stages apart, i.e. with $(n/2 - 1)$ intervening stages, the delay measured by the comparator will become significantly less than $n/2$ time slots.

BRIEF DESCRIPTION OF THE DRAWING

The above and other features of my invention will now be described in detail with reference to the accompanying drawing in which:

FIGS. 3, 4 and 5 are logic diagrams of several components of the memory of FIG. 2;

FIG. 6 is a set of graphs relating to the operation of the system of FIG. 1.

SPECIFIC DESCRIPTION

Figure 1:
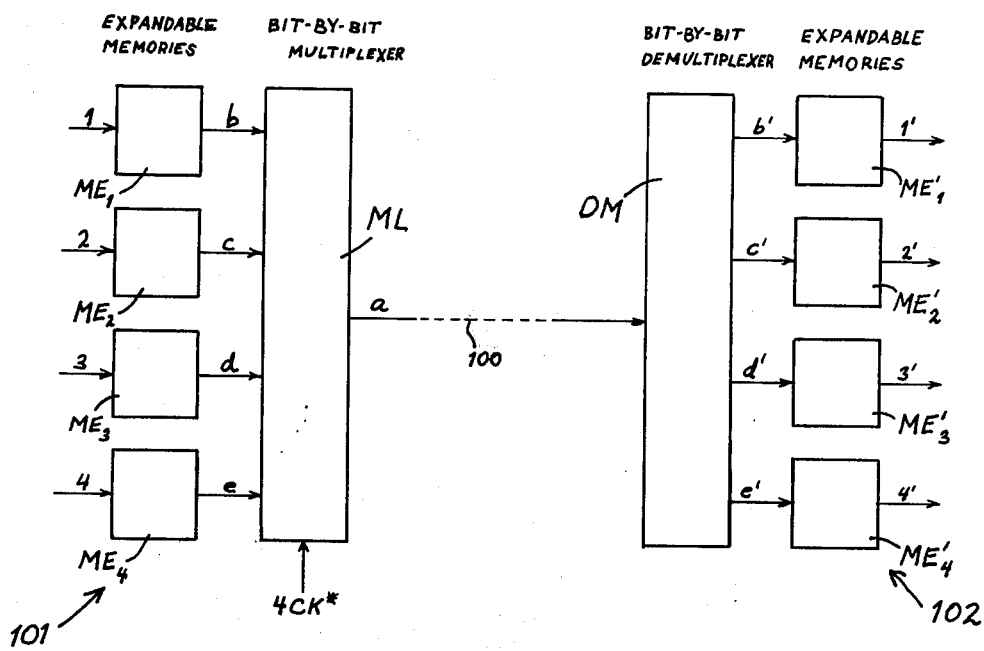
FIG. 1 is a diagrammatic view of a PCM telecommunication system embodying my invention.

In FIG. 1 I have shown a PCM telecommunication system with a transmitting terminal 101 and a receiving terminal 102 interconnected by a link 100. The transmitting terminal 101 simultaneously receives four different bit streams from incoming lines 1–4 which are to be sent on, at the receiving terminal 102, over respective outgoing lines 1'–4'. Incoming lines 1–4 terminate at respective memories $ME_1$–$ME_4$ of the expandable type, more fully described hereinafter, with outputs b, c, d and e extending to a conventional bit-by-bit multiplexer ML. A composite bit stream in the form of a recurrent frame $a$ travels over the link 100 to a complementary bit-by-bit demultiplexer DM, also known per se, distributing the arriving bits in their original order via outputs b', c', d' and e' to respective expandable memories $ME'_1$–$ME'_4$ working into the outgoing lines 1'–4'.

In the present instance it is assumed that each of the incoming lines 1–4 carries a contributing bit stream, in the form of a recurrent lower-order frame, with a cadence of 8.448 Mbits/sec and that the interleaved bits from these four lines, which are cyclically sampled by the multiplexer ML, are transmitted over link 100 at a frequency $F_m = 34.368$ Mbits/sec as determined by locally generated clock pulses 4CK*, allowance being made for ancillary bits constituting supervisory information such as synchronizing signals, alarm signals, and distribution signals identifying the sources of the several interleaved bit streams. The higher-order frame $a$ also includes four bit positions or time slots reserved for possible stuffing bits which are designed to harmonize the average bit cadence in the output of multiplexer ML with the actual cadence of the bits arriving over the incoming lines 1–4. The stuffing bits are generated in the transmitting memories $ME_1$–$ME_4$, as more fully described hereinafter, and are eliminated by the receiving memories $ME'_1$–$ME'_4$ under the control of certain discriminating bits also included in frame $a$.

It will be convenient at this point to examine the chart of FIG. 6 encompassing a period T of composite frame $a$, that frame being represented by the correspondingly designated graph (a) of this chart. Frame $a$ is subdivided into four subframes of periods $t_1$, $t_2$, $t_3$ and $t_4$, respectively. Each subframe contains a small number of ancillary bits $B'_1$, $B'_2$, $B'_3$, $B'_4$ (short strokes) and a large number of message bits $B_1$–$B_4$ (long strokes). The next four graphs (b), (c), (d) and (e) represent the bit streams read out, after interim storage, to multiplexer ML from the several memories $ME_1$–$ME_4$ (FIG. 1) over their correspondingly designated outputs in the course of a frame period T. It will be noted that each of these delayed bit groups contains three ancillary bits $B'_1$ preceding the message bits $B_1$ in the first subframe period $t_1$, a single ancillary bit $B'_2$ — serving as a discriminating bit — preceding the message bits $B_2$ in period $t_2$, a similar discriminating bit $B'_3$ preceding the message bits $B_3$ in period $t_3$, and a further discriminating bit $B'_4$ immediately followed by a bit $B''$ ahead of the message bits $B_4$ in period $t_4$. Bit $B''$ may be used alternatively as a message bit or as a stuffing bit.

Frame $a$ is assumed to contain a total number of 1536 bits, or 384 bits per subframe. Thus, the number of message bits contributed to the frame $a$ by each constituent bit group is either 378 or 377, depending on whether the bit $B''$ constitutes a message bit or a stuffing bit. The character of bit $B''$ is indicated by the three discriminating bits $B'_2$, $B'_3$ and $B'_4$ of the corresponding bit group which, in the embodiment here described, are all "0" in the first instance and all "1" in the second instance. The presence of three identical discriminating bits preceding the changeable bit $B''$ allows the associated detector at the receiving terminal, operating during the corresponding time slots, to make a decision on the basis of the majority of these three bits, thus greatly reducing the risk of malfunction on account of a possible transmission error.

With the aforementioned cadence of 34.368 Mbits/sec, corresponding to 8.592 Mbits/sec for each constituent group, the average transmission frequency for the message bits of each group equals $$8.592 \cdot (378/384) \approx 8.457 \text{ Mbits/sec}$$

in the absence of stuffing bits and $$8.592 \cdot (377/384) \approx 8.435 \text{ Mbits/sec}$$

when such stuffing bits are used. The mean transmission frequency for these message bits, therefore, is $$(8.457 + 8.435)/2 \approx 8.448 \text{ Mbits/sec}$$

which corresponds to the arrival rate of the bits over lines 1–4 in FIG. 1. It should be noted that, as used in the present context, the term "message bits" ($B_1$–$B_4$) encompasses all the bits contributed by the incoming bit streams, including those used for supervisory signaling in the lower-order frames and destined to be preserved in the further transmission over lines 1'–4'.

Figure 2:
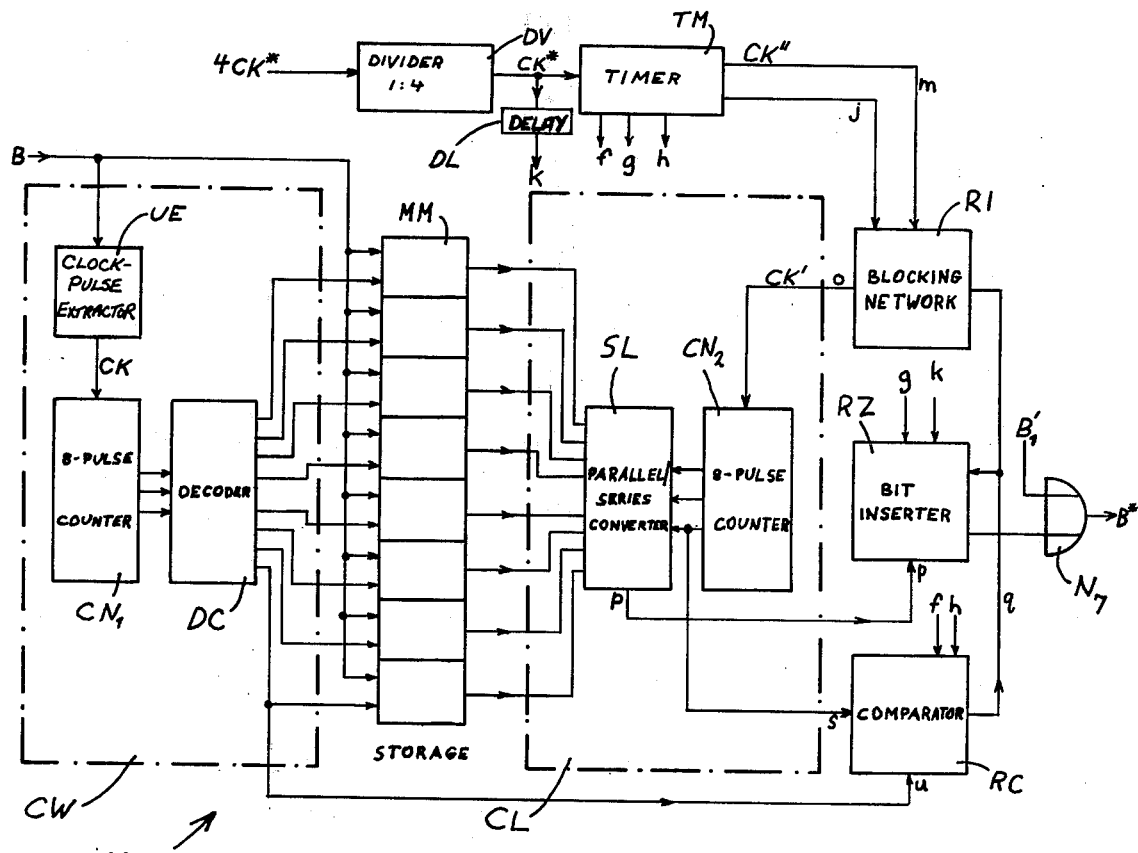
FIG. 2 is a more detailed circuit diagram of an expandable transmitting memory forming part of the system of FIG. 1.

Reference will now be made to FIG. 2 which shows an expandable memory ME according to my invention, representative of any of the transmitting memories $ME_1$–$ME_4$ of FIG. 1.

This memory comprises an 8-stage buffer register MM receiving the incoming bits B of the corresponding line, a writing section CW controlling the loading of register MM with these bits, and a reading section CL controlling the unloading of that register in a bit stream B* fed to the multiplexer ML of FIG. 1. Bit stream B* includes all the message bits $B_1$–$B_4$ in one of the graphs (b)–(e) of FIG. 6 together with the corresponding ancillary bits $B'_1$, $B'_2$, $B'_3$, $B'_4$ as well as the changeable bit $B''$.

Writing section CW comprises an extraction unit UE deriving a recurrent clock pulse CK from bit stream B at the cadence thereof, i.e. at 8.448 Mbits/sec as assumed above. The extracted clock pulses CK are supplied to an 8-pulse binary counter $CN_1$ which feeds a decoder DC for the sequential energization of writing-control inputs of the several stages of register MM. The contents of these stages, updated every eight clock cycles, are read out to a parallel/series converter SL stepped by another 8-pulse binary counter $CN_2$ at the cadence of a pulse train CK' derived from the locally generated clock pulses 4CK* with the aid of a divider DV of step-down ratio 1:4, a timer TM and a blocking network or pulse suppressor RI. Unit RI is controlled, via a lead q, by a comparator RC whose inputs s and u are tied to the third stage of binary counter $CN_2$ and to the eighth-stage writing-control input of register MM. Timer TM, feeding pulses CK'' coincident with clock pulses CK* via a lead m to pulse suppressor RI, further has outputs f, g, h and j, the latter also leading to network RI; output g of timer TM extends to a bit inserter RZ along with outputs p and p from converter SL and comparator RC, the latter being further connected to the output leads f and h of the timer. The output pulses CK* of frequency divider DV are also delivered to insertion network RZ over a lead k which includes a delay network DL whose delay time is different for the several memories $ME_1$–$ME_4$. Blocking network RI has an output lead o carrying the pulse sequence CK'. The pulses appearing on the leads f–o are shown on the correspondingly labeled graphs of FIG. 6 and will be discussed hereinafter with reference to FIGS. 3–5.

Figure 3:
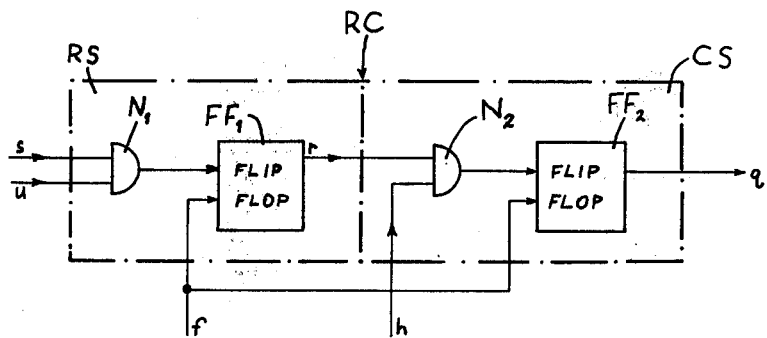

FIG. 3 shows details of the comparator RC illustrated in FIG. 2. The comparator is divided into a primary or presetting section RS and a secondary or execution section CS. Section RS comprises an AND gate $N_1$ with input leads s and u, this gate working into the setting input of a flip-flop $FF_1$ whose resetting input is tied to lead f. Flip-flop $FF_1$ has an output lead r extending, together with timer lead h, to an AND gate $N_2$ in section CS, the latter gate working into a setting input of another flip-flop $FF_2$ also having a resetting input connected to timer lead f. Lead q represents the set output of flip-flop $FF_2$.

As shown in FIG. 4, pulse suppressor R1 comprises an AND gate $N_3$ with input leads j, q working into an inverting input of another AND gate $N_4$ in cascade therewith, gate $N_4$ having a noninverting input tied to lead m to receive the timing pulses CK''. Pulses CK' appear on the output lead o of gate $N_4$. Naturally, element $N_3$ could also be a NAND gate in which case neither input of gate $N_4$ need be inverting; thus, circuit $N_3$, $N_4$ represents the combination of an anticoincidence gate and a coincidence gate in cascade.

In FIG. 5 I have shown details of bit inserter RZ comprising a further AND gate $N_5$ with three inputs tied to leads g, k and q. The output of gate $N_5$ is connected to an input of an OR gate $N_6$ whose other input is joined to lead p originating at the converter or reading matrix SL of FIG. 2. Summing gate $N_6$ produces the output pulses B of network RZ.

The locally generated clock pulses CK*, appearing on lead k and fed to timer TM, have been illustrated on graph (k) of FIG. 6 as a continuous pulse train whose cadence $F_m/4$ equals 9.592 Mbits/sec in the specific example here discussed. As shown in graph (m), the output pulses CK'' of the timer are in step with the pulses CK* of graph (k) but are suppressed at the start of each subframe, thus leaving a 3-pulse gap at the beginning of subframe $t_1$ and a 1-pulse gap at the beginning of each subframe $t_2$, $t_3$ and $t_4$. The ancillary bits represented by shorter strokes in graphs (b)–(e) fall into these initial gaps. Multiplexer ML, FIG. 1, receives a continuous train of stepping pulses 4CK* at four times the cadence of clock pulses CK*, i.e. 34.368 Mbits/sec. As shown in graphs (f), (g), (h) and (j), a control pulse appears on timer lead f in the first time slot of subframe $t_1$, on timer lead g in the first time slot of each of the subsequent subframes $t_2$, $t_3$ and $t_4$, on lead (h) in the first time slot of subframe $t_2$, and on lead j in the second time slot of subframe $t_4$. Timer TM is common to all the memories $M_1$–$M_4$ in FIG. 4, each of its control pulses being wide enough to span the staggered bit positions of the bit streams issuing from these four memories.

The connection of the lead s to the third and last stage of the binary pulse counter $CN_2$ insures the energization of that lead when the counter, being reset by every eighth stepping pulse CK', receives the fourth stepping pulse of a cycle, its binary setting 1-0-0 being translated by the matrix SL into a reading signal for the fourth stage of register MM. With lead u originating at a writing-control input of the eighth stage of that register, simultaneous energization of leads s and u will not occur when stage No. 4 is unloaded after the loading of stage No. 8, i.e. when an interval exceeding four time slots intervenes between the loading and the unloading of any register stage.

The appearance of a control pulse on lead f (FIG. 3) resets the flip-flops $FF_1$ and $FF_2$ of comparator RC, if they were previously set, at the beginning of each frame period T. If, during the first subframe $t_1$, the presetting section RS of comparator RC detects the coincidence of signals s and u, gate $N_1$ conducts and sets the flip-flop $FF_1$ which thereupon generates a preparatory signal on its set output r. This signal, fed to gate $N_2$ in execution section CS, does not become effective until that gate is unblocked by a control pulse on lead h at the beginning of the second subframe $t_2$. At that point the output of gate $N_2$ sets the flip-flop $FF_2$, causing the emission of a stuffing command on lead q. This command, accordingly, persists for the remainder of the frame period T, i.e. until flip-flop $FF_2$ is reset by a pulse on lead f at the beginning of the next frame.

Voltage on lead q energizes one input of gate $N_3$ in blocking network RI (FIG. 4) and one input of gate $N_5$ in insertion network RZ (FIG. 5). Gate $N_4$ in network RI continues to pass the clock pulses CK'' on lead m to its output o as long as the second input j of gate $N_3$ is de-energized; upon the appearance of a pulse on the latter lead, i.e. in the second time slot of subframe $t_4$, gate $N_4$ is blocked and inhibits the generation of a stepping pulse CK' on lead o. Thus, the reading matrix SL of register MM may or may not be stepped in that second time slot, as indicated by a broken stroke in the corresponding position of graph (o) in FIG. 6, depending on whether the pulses on leads s and u do or do not coincide in the first subframe of that particular frame; the relative shift of these pulses, due to the difference between the cadences of pulse trains CK and CK'', is slow and pulse s remains in existence during the reading or unloading of the fourth, fifth, sixth and seventh register stages so that coincidence — when it occurs — will be detectable for at least a full frame period whereby AND gate $N_1$ (FIG. 3) will always conduct in the first subframe $t_1$ when bit stuffing is called for.

With input lead g of AND gate $N_5$ in network RZ energized, a control pulse on lead g coinciding with a clock pulse CK* on lead k unblocks that gate to generate one of the discriminating bits $B'_2$, $B'_3$, $B'_4$ in the output of OR gate $N_6$ at the beginning of each subframe other than the first one. The discriminating bits on the output leads b–e of memories $ME_1$–$ME_4$ are relatively staggered, as indicated by the corresponding graphs of FIG. 6, on account of the delay introduced by the respective networks DL; for the pulses represented by the three bottom graphs of FIG. 6 this delay, with reference to the pulse train CK* in the output of the common divider DV, is assumed to be zero. The same relative staggering, of course, applies to all the message bits from lines 1–4, which are to be interleaved in multiplexer ML, as well as to their ancillary bits $B'_1$.

If the absence of a stuffing command on lead q prevents the conduction of AND gate $N_5$ in a given frame, the bit passing the OR gate $N_6$ in the second time slot of subframe $t_4$ in lieu of a discriminating bit is the message bit then appearing in the output p of reading matrix SL which at this point is normally stepped by the counter $CN_2$, there being no inhibition of the delivery of pulses CK' by the blocking network RI. The bits emitted by OR gate $N_6$, supplemented in another OR gate $N_7$ by the ancillary bits $B'_1$ from a conventional supervisory circuit not shown, form part of a bit stream B* which is interleaved with corresponding bit streams from the other expandable memories of the transmitting terminal 101 for delivery to the receiving terminal 102 via PCM link 100 (FIG. 1).

Figure 7:
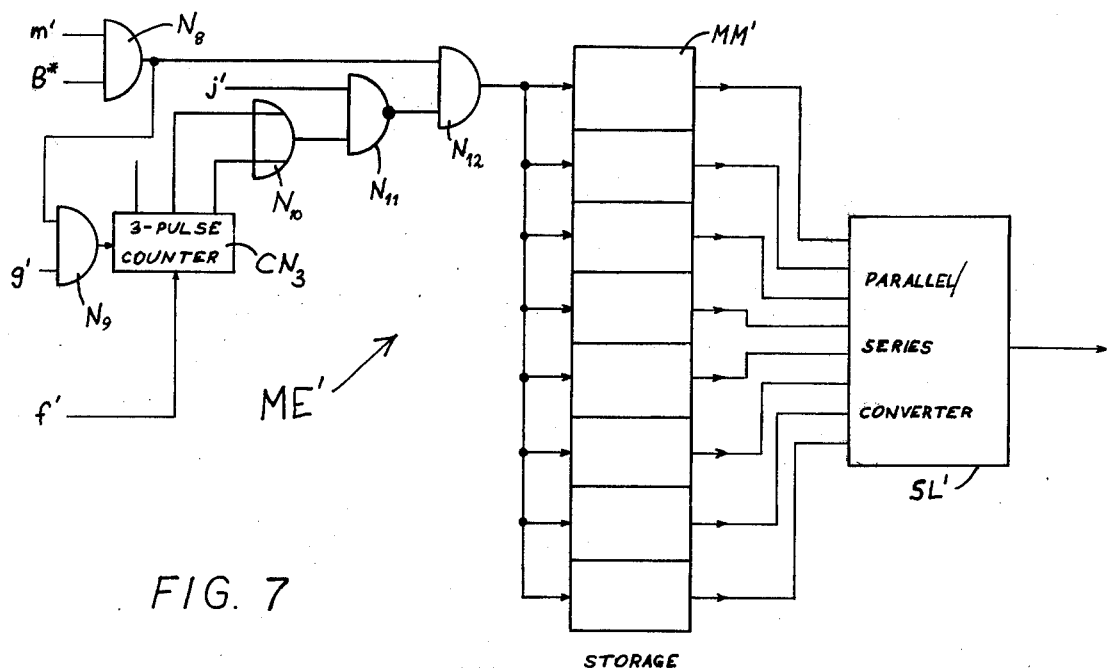
FIG. 7 is a circuit diagram of an expandable receiving memory complementary to the transmitting memory of FIG. 2.

In FIG. 7 I have shown a memory ME', representative of any of the receiving memories $ME'_1$–$ME'_4$, designed to eliminate the ancillary bits from an incoming bit stream B* exiting from demultiplexer DM. The corresponding output lead of the demultiplexer, designated b'–e' in FIG. 1, terminates at an AND gate $N_8$ also provided with an input lead m' carrying pulses similar to those shown in graph (m) of FIG. 6. Another AND gate $N_9$ receives the output of gate $N_8$ together with control pulses on a lead g' corresponding to those shown in graph (g) of FIG. 6. Gate $N_8$, accordingly, passes only the discriminating bits (if any) contained in bit stream B* and feeds them to the stepping input of a three-pulse counter $CN_3$ which is reset at the start of each frame by a control pulse on a lead f' analogous to the one shown in graph (f) of FIG. 6. Counter $CN_3$ has two output leads, respectively energized on a count of 2 and of 3, which terminate at an OR gate $N_{10}$ feeding one input of a NAND gate $N_{11}$; the latter also receives a control pulse on a timer lead j' similar to the one shown in graph (j) of FIG. 6. Gate $N_{11}$ works into a further AND gate $N_{12}$ also having an input connected to the output of gate $N_8$.

AND gate $N_{12}$, accordingly, transmits the bits of stream B* in the presence of timing pulses on lead m', except in the second time slot of the fourth subframe if that time slot is preceded by at least two discriminating bits in the same frame. The bit suppressed by the output of pulse counter $CN_3$ is, of course, always a "0"; if no suppression takes place, i.e. if a message bit is present in the time slot referred to, the value of that bit can be either "0" or "1". The bits passing the gate $N_{12}$ are successively loaded into stages of an eight-stage buffer register MM' and read out with the aid of a matrix SL', i.e. a parallel/series converter, generally in the manner described for register MM of FIG. 2; the writing in the register stages is again controlled by clock pulses extracted from the incoming bit stream whereas the reading proceeds in response to a continuous train of locally generated clock pulses having the cadence of original pulses CK.

I claim:

1. In a telecommunication system with a transmitting terminal at an input end of a PCM link, a receiving terminal at an output end of said link, a number z of incoming lines at said transmitting terminal carrying respective streams of message bits organized in lower-order frames divided into a multiplicity of time slots occurring at a first bit cadence, multiplexing means at said transmitting terminal for the bit-by-bit interleaving of said lower-order frames from said incoming lines into a higher-order frame sent out via said link to said receiving terminal at z times a second bit cadence higher than said first bit cadence to provide additional time slots for the inclusion of ancillary bits constituting supervisory signals, a set of first expandable memories respectively inserted between said incoming lines and said multiplexing means for facilitating the introduction of said ancillary bits into said additional time slots, a number z of outgoing lines at said receiving terminal respectively paired with said incoming lines, demultiplexing means at said receiving terminal for redistributing the interleaved message bits of said higher-order frame to said outgoing lines, and a set of second expandable memories respectively inserted between said demultiplexing means and said outgoing lines for facilitating the suppression of ancillary bits introduced at said first expandable memories, the improvement wherein each expandable memory of said first set comprises:

register means with n stages for the temporary storage of n consecutive message bits of an incoming bit stream;

writing-control means for timing the recurrent sequential loading of said stages at a rate corresponding to said first bit cadence;

reading-control means for timing the recurrent sequential unloading of said stages, during intervals of predetermined length representing several subframes of a recurrent higher-order frame, at a rate corresponding to said second bit cadence but with an initial gap at the beginning of each subframe for the insertion of at least one ancillary bit;

comparison means connected to said writing-control means and to said reading-control means for determining the delay between the loading and the unloading of a given stage of said register means and for generating a preparatory signal upon said delay falling short of a predetermined period equaling less than n bit cycles of said first bit cadence;

timing means for generating distinctive control pulses in different subframes, said comparison means including circuitry controlled by said timing means for emitting a stuffing command in response to the generation of said preparatory signal in an early subframe of said higher-order frame;

blocking means responsive to said stuffing command and to a control pulse from said timing means for inhibiting the unloading of a stage of said register means in a predetermined time slot of a later subframe of said higher-order frame, following said early subframe, normally allocated to a message bit; and insertion means responsive to said stuffing command and to a control pulse from said timing means for generating, in at least one initial gap of a subframe following said early subframe, a discriminating bit informing the corresponding memory of said second set of the absence of a message bit in said predetermined time slot.

2. The improvement defined in claim 1 wherein said comparison means comprises a presetting section and an execution section, said presetting section including a first coincidence gate with inputs connected to respective outputs of said writing-control means and said reading-control means and a first flip-flop with a setting input connected to the output of said first coincidence gate, said execution section including a second coincidence gate with inputs respectively connected to a set output of said first flip-flop and to an output of said timing means carrying a control pulse at the beginning of the second subframe of said higher-order frame and further including a second flip-flop with a setting input connected to the output of said second coincidence gate, said second flip flop having a set output emitting said stuffing command, each of said flip-flops having a resetting input connected to an output of said timing means carrying a control pulse at the beginning of said first subframe.

3. The improvement defined in claim 1 wherein said blocking means comprises an anticoincidence gate and a coincidence gate in cascade, said anticoincidence gate having inputs connected to said comparison means and to said timing means for receiving said stuffing command and a control pulse occurring during said predetermined time slot, said coincidence gate having a first input connected to a source of clock pulses of said second bit cadence and a second input connected to the output of said anticoincidence gate.

4. The improvement defined in claim 1 wherein said insertion means comprises a coincidence gate and a summing gate in cascade, said coincidence gate having a first input connected to said comparison means for receiving said stuffing command, a second input connected to a source of clock pulses of said second bit cadence, and a third input connected to said timing means for receiving a control pulse during the initial gap of each subframe other than said first subframe, said summing gate having a first input connected to said register means for receiving the stored bids read out from the stages thereof and a second input connected to the output of said coincidence gate.

5. The improvement defined in claim 1 wherein said reading-control means comprises a pulse counter of capacity $n$ connected to be stepped by said clock pulses through the intermediary of said blocking means, said comparison means having input connections to a writing-control input of one specific stage of said register means and to an output of said pulse counter energized during the reading of another specific stage of said register means.

6. The improvement defined in claim 5 wherein said specific stages are $n/2$ stages apart.

7. The improvement defined in claim 6 wherein $n = 8$, said pulse counter having three binary stage outputs, said comparison means being connected to the writing-control input of the eighth stage of said register means and to the third stage output of said pulse counter.

8. The improvement defined in claim 5 wherein said reading-control means further comprises a parallel/series converter controlled by said pulse counter, said converter having inputs connected to the stages of said register means and an output leading to said insertion means.

9. The improvement defined in claim 1 wherein the number of subframes in said higher-order frame is four, said insertion means being controlled by said timing means to generate said discriminating bit in the initial gaps of the second, third and fourth subframes of said higher-order frame, said predetermined time slot following immediately the initial gap of said fourth subframe.

10. The improvement defined in claim 1 wherein $z=4$.

* * * * *